United States Patent
Pardo

(10) Patent No.: US 7,552,662 B2
(45) Date of Patent: Jun. 30, 2009

(54) NOVOLUTE GEOMETRY FOR POWER GEARS

(76) Inventor: Miguel Alejandro Pardo, Carrera 9A #93-76 Int #307, Bogota (CO) 8

(*) Notice: Subject to any disclaimer, the term of this patent is extended or adjusted under 35 U.S.C. 154(b) by 375 days.

(21) Appl. No.: 10/642,332

(22) Filed: Aug. 18, 2003

(65) Prior Publication Data

US 2004/0040398 A1 Mar. 4, 2004

(30) Foreign Application Priority Data

Aug. 29, 2002 (CO) .................................. 02076759

(51) Int. Cl.
*F16H 1/08* (2006.01)
(52) U.S. Cl. ........................... 74/458; 74/414; 74/424.5
(58) Field of Classification Search ............... 74/412 R, 74/413, 414, 416, 424.5, 457, 458
See application file for complete search history.

(56) References Cited

U.S. PATENT DOCUMENTS 2,541,283 A * 2/1951 Praeg ........................... 451/446
6,148,683 A * 11/2000 Fleytman ...................... 74/425

FOREIGN PATENT DOCUMENTS

JP 61-129489 * 6/1986
WO WO 98/27340 * 6/1998

* cited by examiner

*Primary Examiner*—William C Joyce
(74) *Attorney, Agent, or Firm*—Jacobson Holman PLLC

(57) ABSTRACT

Within the systems used to transmit power and or movement between two shafts, toothed wheels can be used. Also, pairs of screws with their complementary threads engaged can be used. A geometry is described for the thread profiles, for screws used in the transmission of power and or movement between two shafts. That geometry enables the threads to have the widest possible contact. The shafts can be in any relative position: parallel, perpendicular, neither coplanar nor perpendicular, coplanar or not.

12 Claims, 15 Drawing Sheets

FIGURE 10
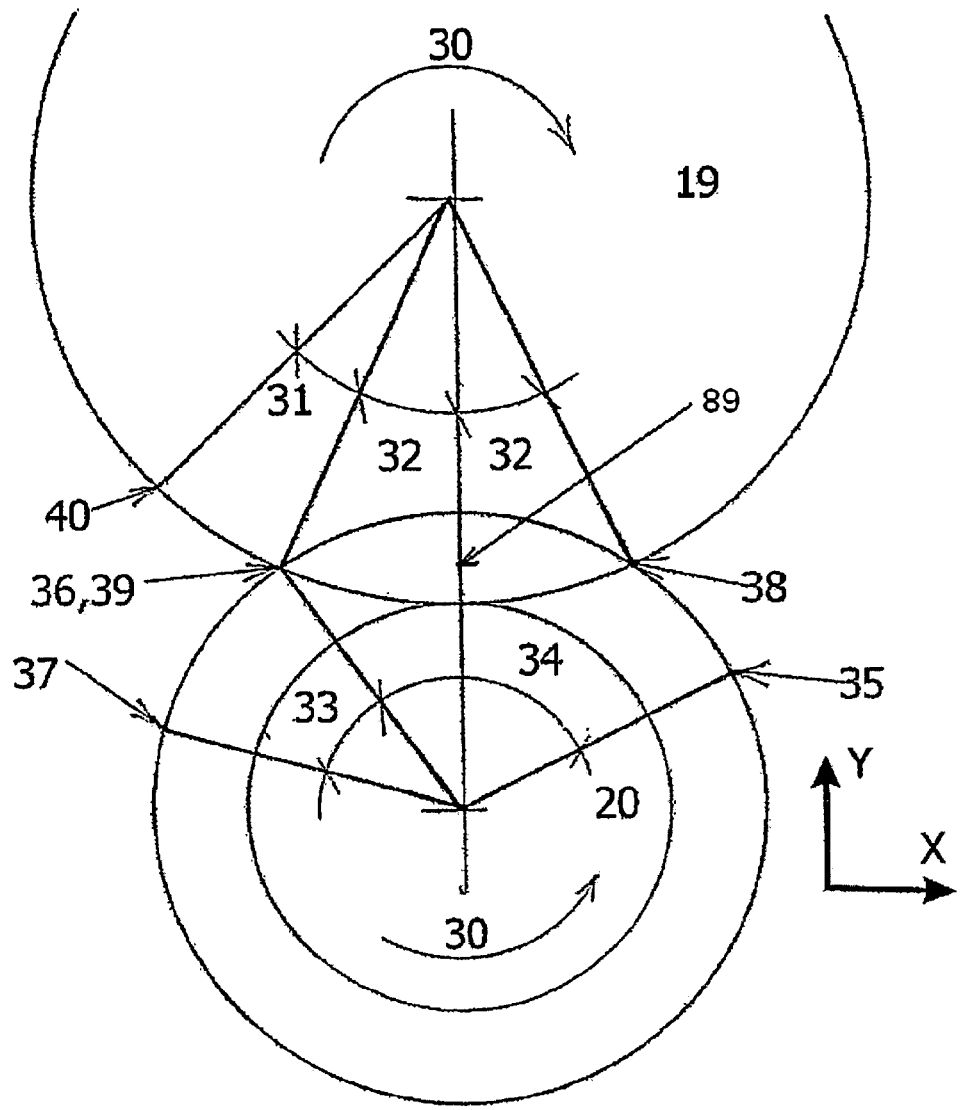
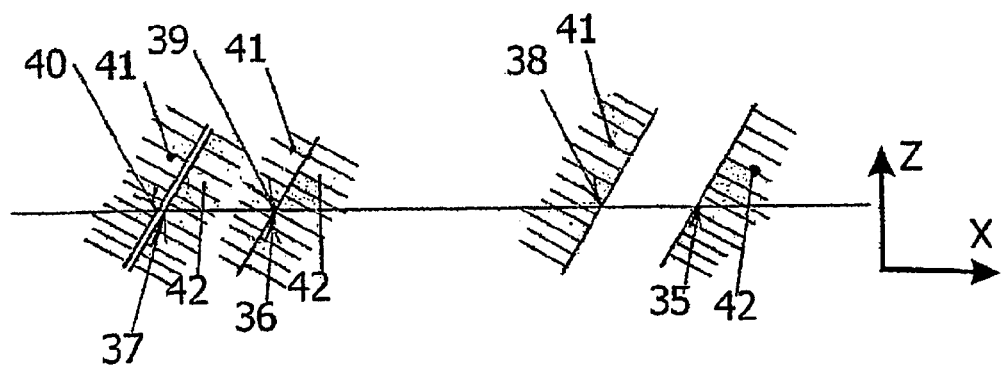

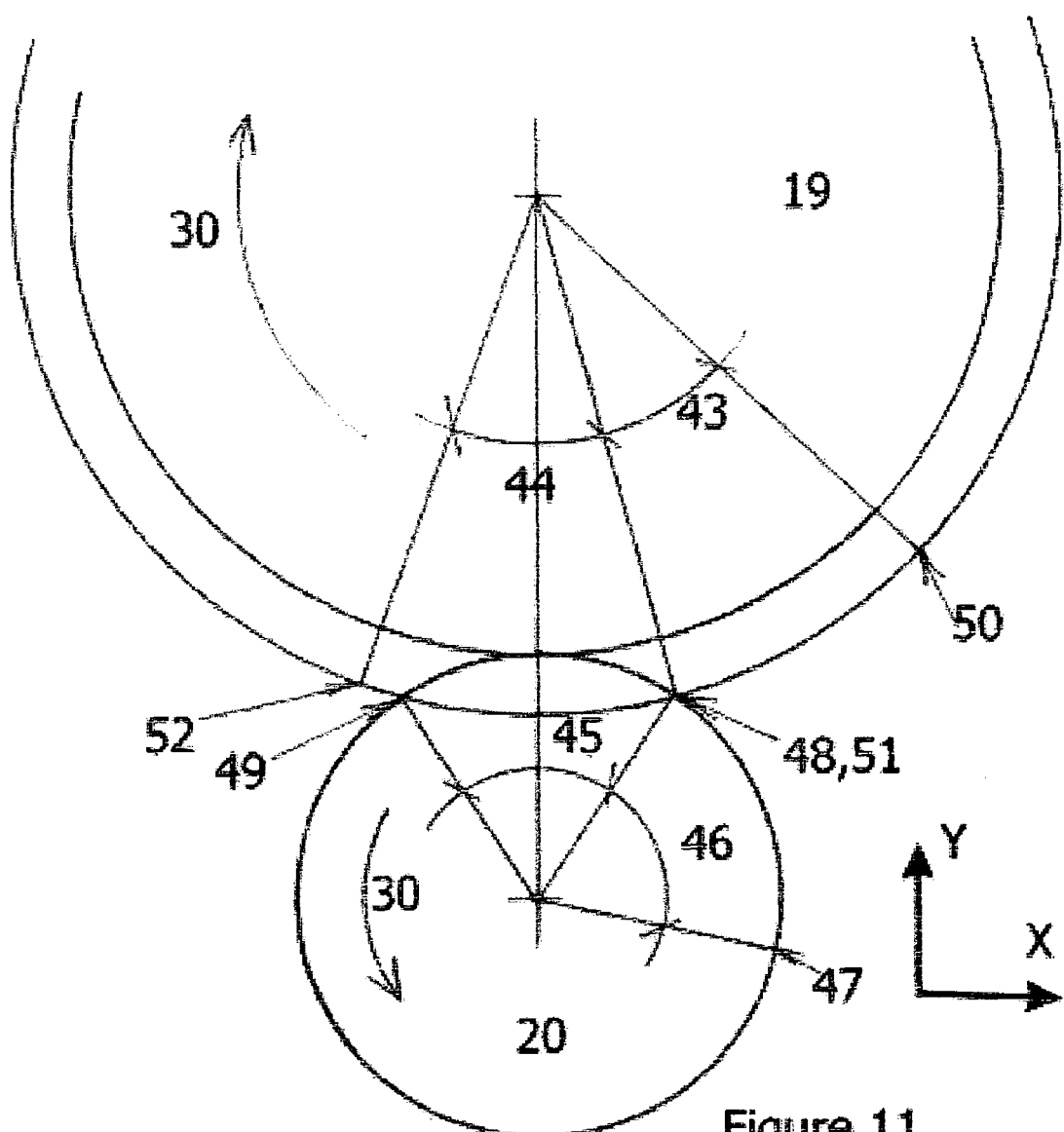
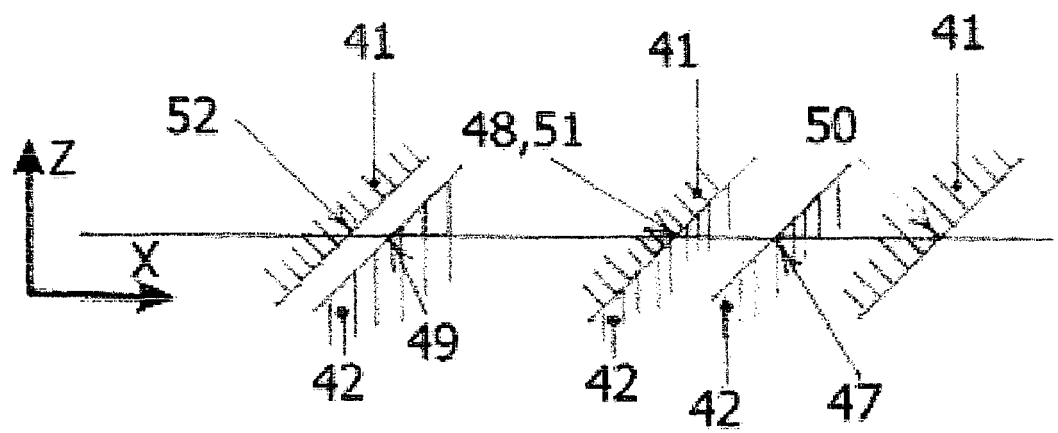
Figure 11

NOVOLUTE GEOMETRY FOR POWER GEARS

CROSS REFERENCE TO RELATED APPLICATIONS

The patent application number 02076759, dated Aug. 29 2002, in the Colombian patent office, Superintendencia de Industria y Comercio is an application for a patent in Colombia, for the same invention.

STATEMENT REGARDING FEDERALLY SPONSORED RESEARCH OR DEVELOPMENT

Not applicable.

REFERENCE TO SEQUENCE LISTING, A TABLE, OR A COMPUTER PROGRAM LISTING COMPACT DISK APPENDIX

Not applicable

BACKGROUND OF THE INVENTION

Wherever motion and power are to be transmitted between a motor and a driven machine, gear wheels are a common element used to such transmission, with or without speed change. Always, it has been an aim of the gear makers, to obtain smaller gear parts able to do a given job.

The approach given to the engagement of screws to be used as gears to transmit motion and power, is by novolute geometrical means. The present invention is aimed to help make smaller gear parts, specially in such applications where power transmission is involved. FIG. 1 shows a conventional pair of gear, and a conventional pair of screws engaged.

BRIEF DESCRIPTION OF THE INVENTION

Work began thinking about the advantages of using engaged screws instead of conventional toothed gears for power and motion transmission. The present invention solves the defect of conventional screws in which the scarce angle of contact between the two parts, (seen in the plane of rotation), imposes a severe limit to power transmission capacity. The geometry that is made public here, allows the contact between the two parts to take place over the widest possible angle existing within the intersection of the two bodies of the parts.

Engaged threads have a smoother action than gear teeth, due to several factors: Errors in manufacturing of the teeth, make the operation rough, causing great trouble and sudden changes in speed that lead to strong overloads on the parts, not only the teeth, but upon shafts, gear blanks, bearings and supports, and even on driving and driven machinery.

Deflection due to work loads leads to the loss of the appropriate shape of the teeth, thus taking further all the disadvantages just described.

Normal engaging action, takes place between two teeth at a moment and then, between two pairs of teeth, and again between just one pair, makes the work load change rapidly. This also introducing changes in the working conditions and again affects the way in which the machine elements are stressed.

During the short time a single pair of teeth are engaged, the load application point changes along the height of the tooth, again it affects the way they are stressed and strained, this again adding to the transitional phenomenons occurring while the gear works.

The above facts, relate to the structural behavior of the gear and its teeth. All of them also affect the stresses and strains suffered by the contacting surfaces, which must deform superficially, in response to the loads applied, and depending of the geometry of the specific working zones in contact which also change along the path of contact.

After seeking for a solution for the disadvantages of conventional screws, to enable them to replace conventional gears, I came to the conclusion of the invention of the Novolute, which compensates the loss of load carrying capacity due to the high helix angle, with an important increment in the use of the material already present into the screws. In a very favorable way, both because of the full width of the contact obtained, and because of the big curvature radius of the novolute surfaces, enable them for high load carrying capacity. The advantages given by the new design, lead towards the possibility of building much smaller parts, that are still able to do the same job than conventional bigger ones.

Lubrication

Lubrication, is also affected by the factors described above, that makes a very unsteady operation.

Rolling surfaces operate with relative velocities which, in each contact cycle go from high sliding, with some rolling action, to a simple rolling action, with no slipping, while contact exists on the pitch line, and again increasing the sliding speed but in opposite direction during the rest of the engagement, until contact is suddenly lost, only to be taken over by a different pair of teeth.

It is true that the real condition is not of simple sliding, it includes also a rolling action, which is responsible for a better lubrication regime. Even so, the beneficial condition of the rolling action, is limited because during the second half of the contact cycle, rolling takes place in a way in which, instead of feeding oil to the contact zone, it takes it away from the contact zone.

As several threads can be engaged simultaneously, the transition from one thread, as it gets to its end, to another, imposes much smaller dynamic loads on the transmission, in comparison with conventional gears. When the load is shared by two pairs of teeth at most being carried by a single pair. In this respect, engaged screws are similar to helical gears that also share the load between several teeth, but differs in the way it is done: all of the threads in a screw, have an identical cross section working, at all times, constantly while the particular thread is engaged.

Disadvantages

The main disadvantage, is the high axial load produced by screws. The defect is two fold: in one hand, a considerable amount of axial force must be handled in some way, which is useless for the purpose of the transmission. A simple solution is to use herringbone type gears, which does not send these forces to the bearings, but impose other difficulties in the construction.

In the other hand, the threads themselves must carry the same strong force, to produce the same amount of useful work. These factors explain why screw type transmissions have not been used, although they have advantages.

Loaded threads work more like the tire of a car, which, having a deformed portion in contact with the floor, have a very smooth ridding, at any time, there is a portion of the tire, deformed in the same particular shape. The overall shape does not change, only changes the portion of the tire having that shape. In such way, stresses are constant, and the shaft supports only the weight of the car, but not on any amount of dynamic load due to the rotating action. This point makes an important difference, advantageous for screw transmissions over teethed gears, improving load capacity and ability to work at high speed.

After seeking for a solution for the disadvantages of conventional screws, in order to enable them to replace conventional gears, I came to the conclusion of the invention of the Novolute, which compensates the loss of load carrying capacity due to the high helix angle, with an important increment in the use of the material already present into the screws, in a very favorable way, both because of the full width of the contact obtained, and because of the big curvature radius of the novolute surfaces, which enable them for high surface load carrying capacity. The advantages given by the new design, lead towards the possibility of building much smaller parts, that are still able to do the same job than conventional bigger ones.

In involute gears, the action generating the geometry takes place on the plane of rotation, unrolling the profile. That is why that geometry is called involute. As the generating action in the new geometry happens in a different way, it is called the novolute.

BRIEF DESCRIPTION OF THE SEVERAL VIEWS OF THE DRAWING

FIG. 10 Shows the generation process of the first novolute of an engagement. In the upper part, a view in the plane XY is seen. In the lower part, a cross section view in the plane Z X is shown.

38, 39 and 40, are the locus of the generator point, before, during and after the generation. 35, 36, and 37, are the locus of the generated point, for the same three instants considered for the generator. 32 is half the angle rotated by the generator from the first instant until the second, 34 is the angel rotated by the generated in the same time, 31 is the angle rotated by the generator from the generation instant, until the last position, 33 is the angle rotated by the generated in the same time. 30 shows the direction of rotation.

FIG. 11 Shows the generation process for the same engagement, but when the pinion is generator. In the upper part, a view in the plane XY is seen. In the lower part, a cross section view in the plane Z X is shown.

47, 48, and 49 are the locus of the generating point before, during and after the generation. 50, 51 and 52, are the locus of the generated point in the same instants. 43 is the angel rotated by the wheel from the first and until the second instants. 44 is the angle rotated from the second until the third instant, by the wheel. 46 is the angle rotated by the pinion from the first and until the second instant, 45 is the angle rotated by the pinion from the second and until the third instant.

Figure 12:
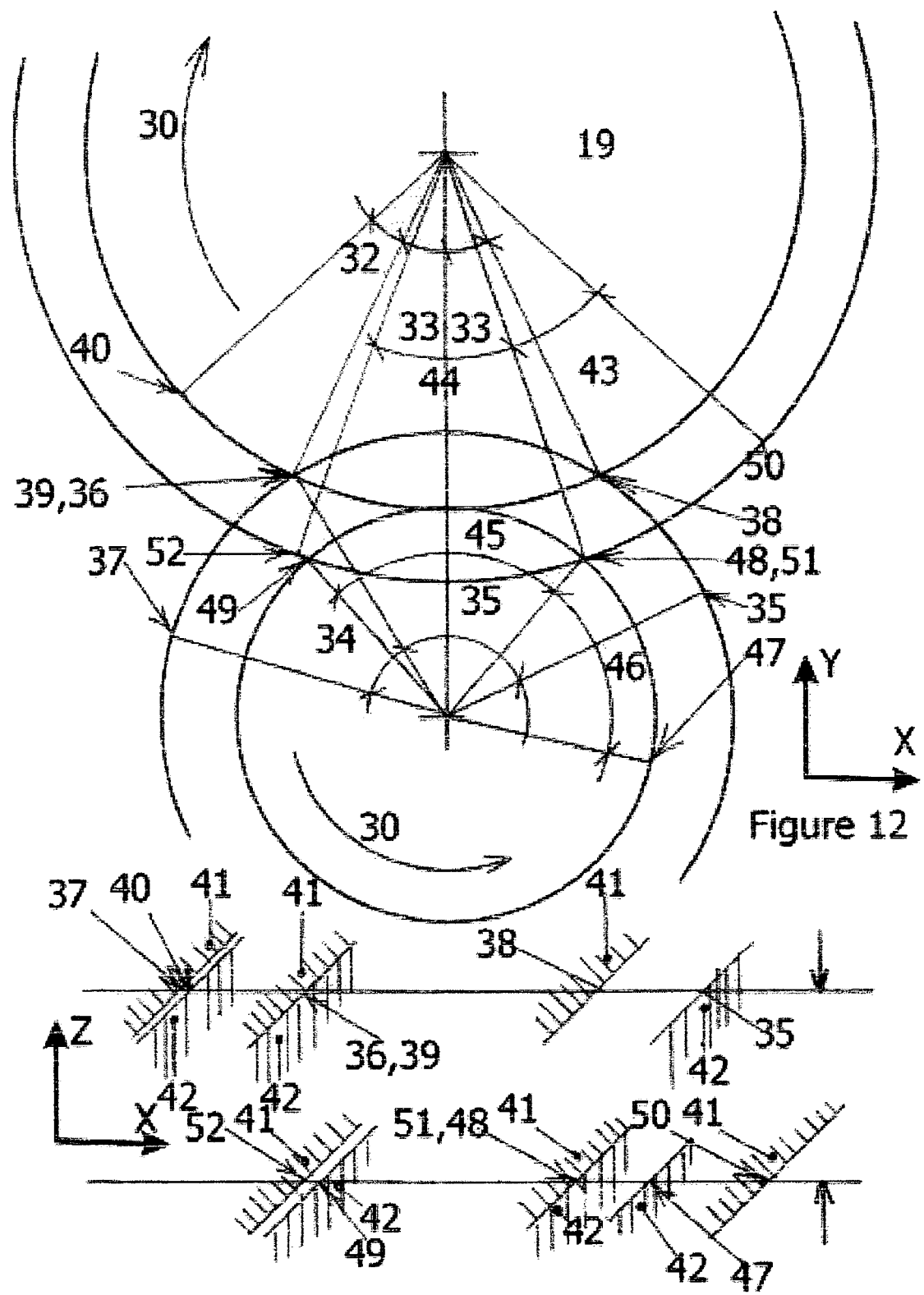

FIG. 12 Shows the generation process for both members, it summarizes FIG. 10 and 11. the upper part, show the engagement in the plane Y X, and the lower one, is a cross section in the plane ZX. The same points and angles as in FIGS. 10 and 11 are described.

Figure 13:
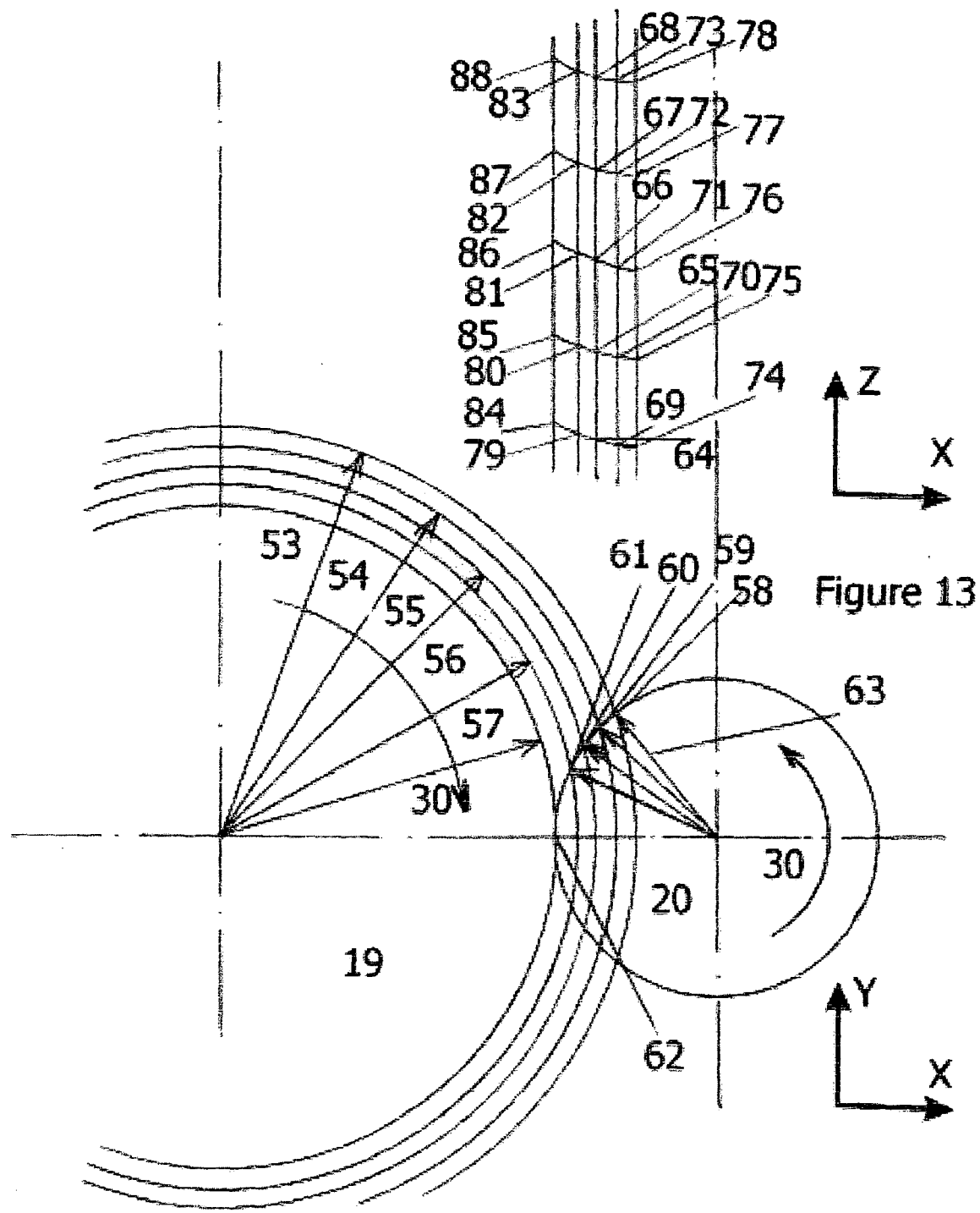

FIG. 13 Shows The analysis of the engagement in the Z direction. The upper part, is a cross section in the ZX plane. The lower part, is a view in the YX plane.

58, 59, 60, 61, and 62, are generating points of the pinion. 53, 54, 55, 56 and 57, are the radiuses on which each one of generating points generate points along the Z direction. 63 is the radius of the generating helical line. 64,65,66,67, and 68 are points generated by point 58.

69,70,71,72,73, are points generated by point 59, 64,65,66,67,68 are points generated by point 60 79,80,81,82,83 are points generated by point 61 84,85,86,87,88 are points generated by point 62

Figure 14:
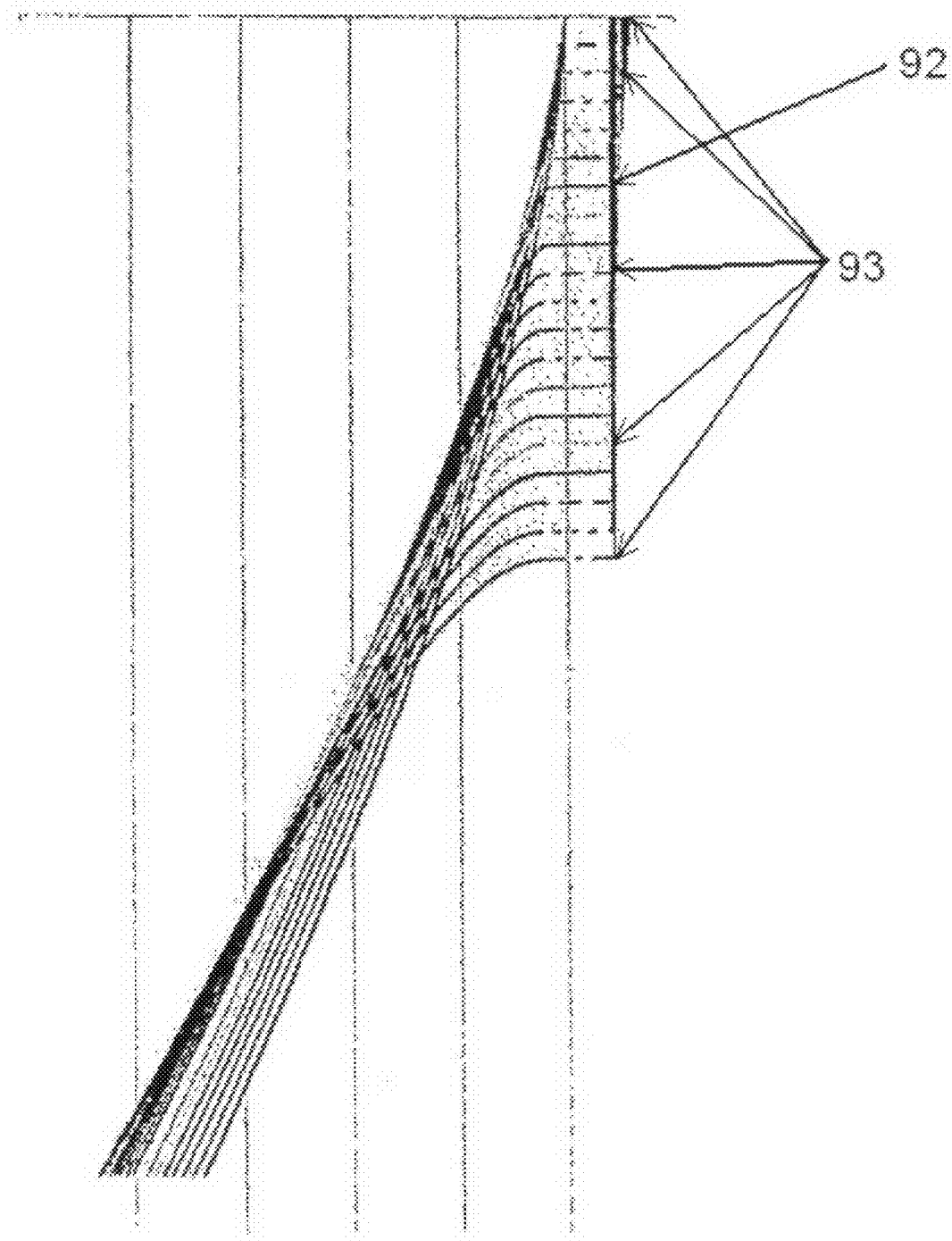

FIG. 14 Shows a series of novolutes generated by several points along a solid generating profile.

Figure 15:
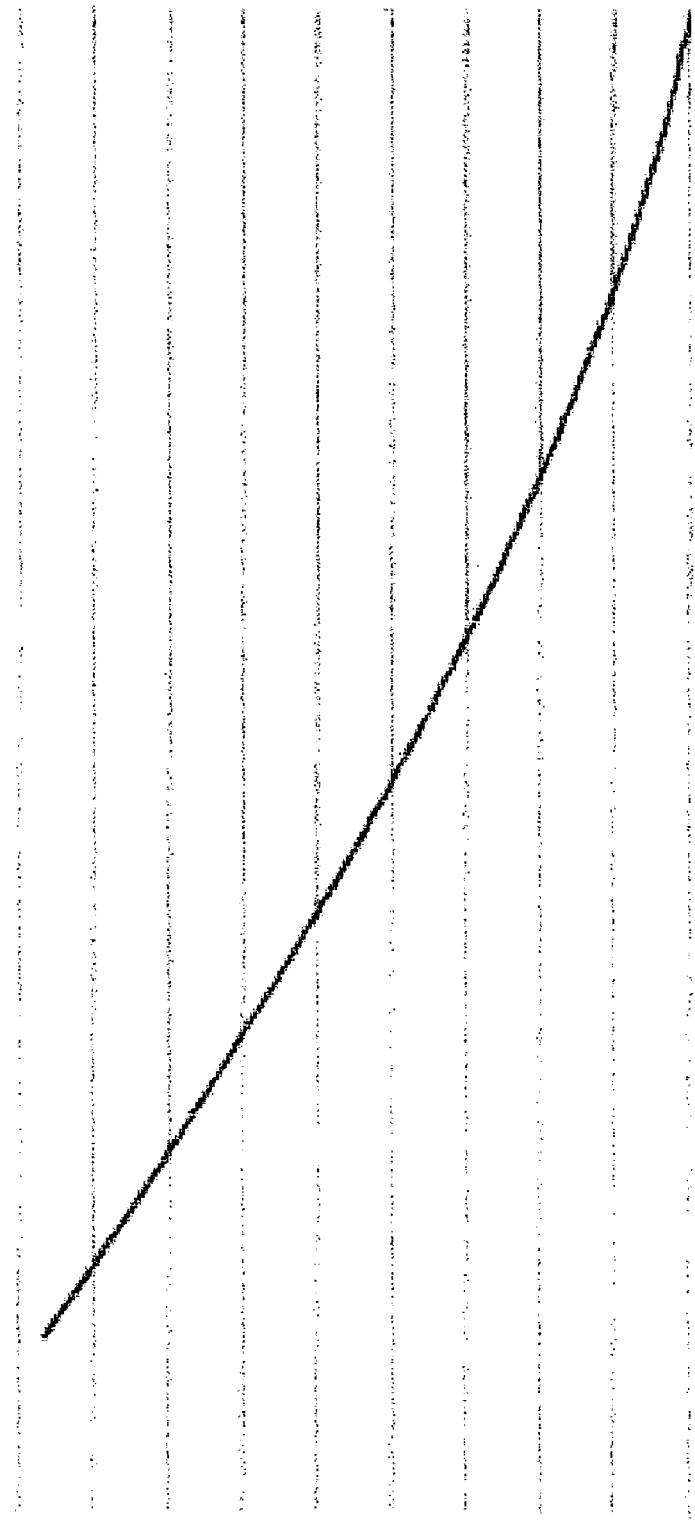

FIG. 15 Shows the modified novolute, it is the line the envelops all the different novolutes shown in FIG. 14.

DETAILED DESCRIPTION OF THE INVENTION

The present invention can be used for gear pairs with their shafts in every possible position in respect to one another: the shafts can be parallel or not, coplanar or not, perpendicular or not, either crossing or not. As it is easier to describe, the invention is described here for parallel shaft engagements. All of the described features can also be built into a gear pair with a different position of the shafts.

1.—Geometry for Parallel Shafts. Description of the Novolute Engagement.

Figure 1A:
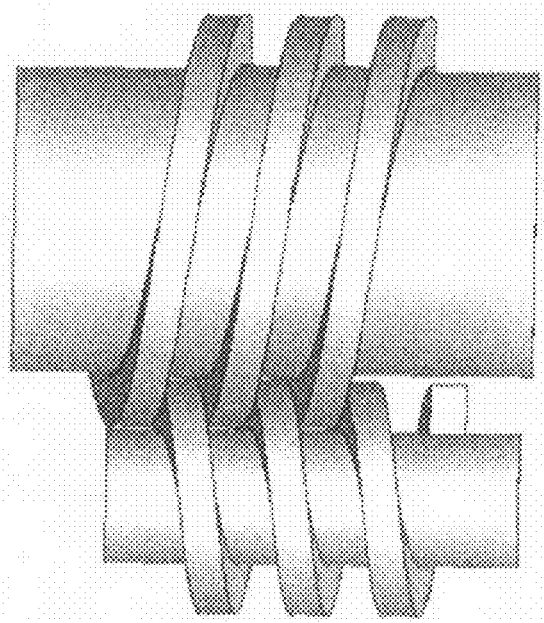
FIG. 1A shows a conventional involute gear engagement.
Figure 1B:
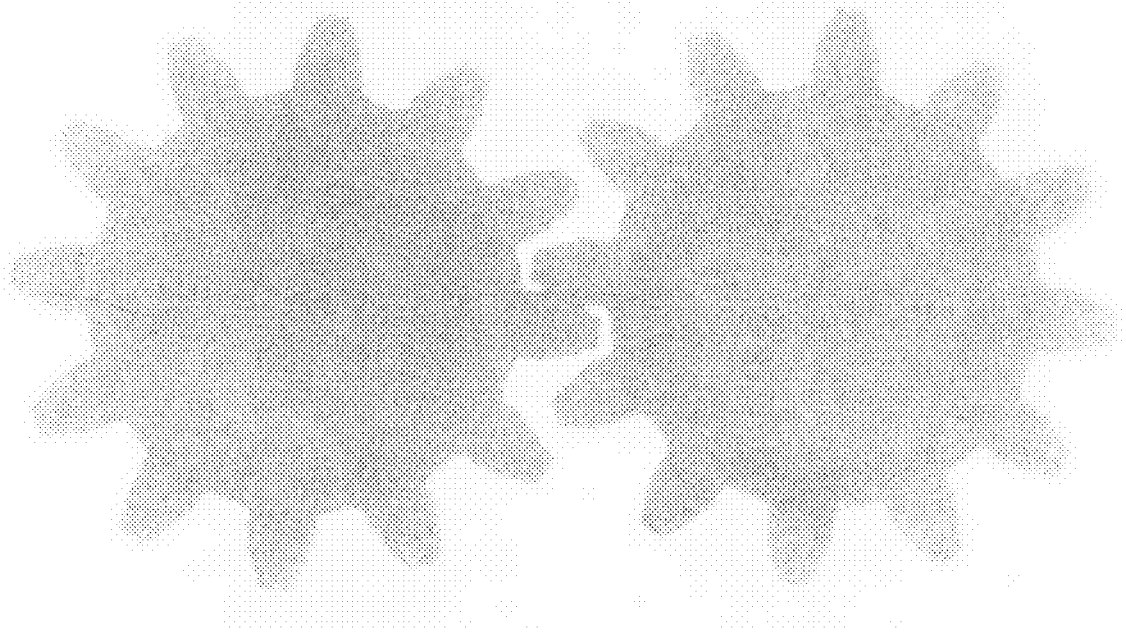
FIG. 1B shows a conventional engagement of coupled screws.
Figure 2:
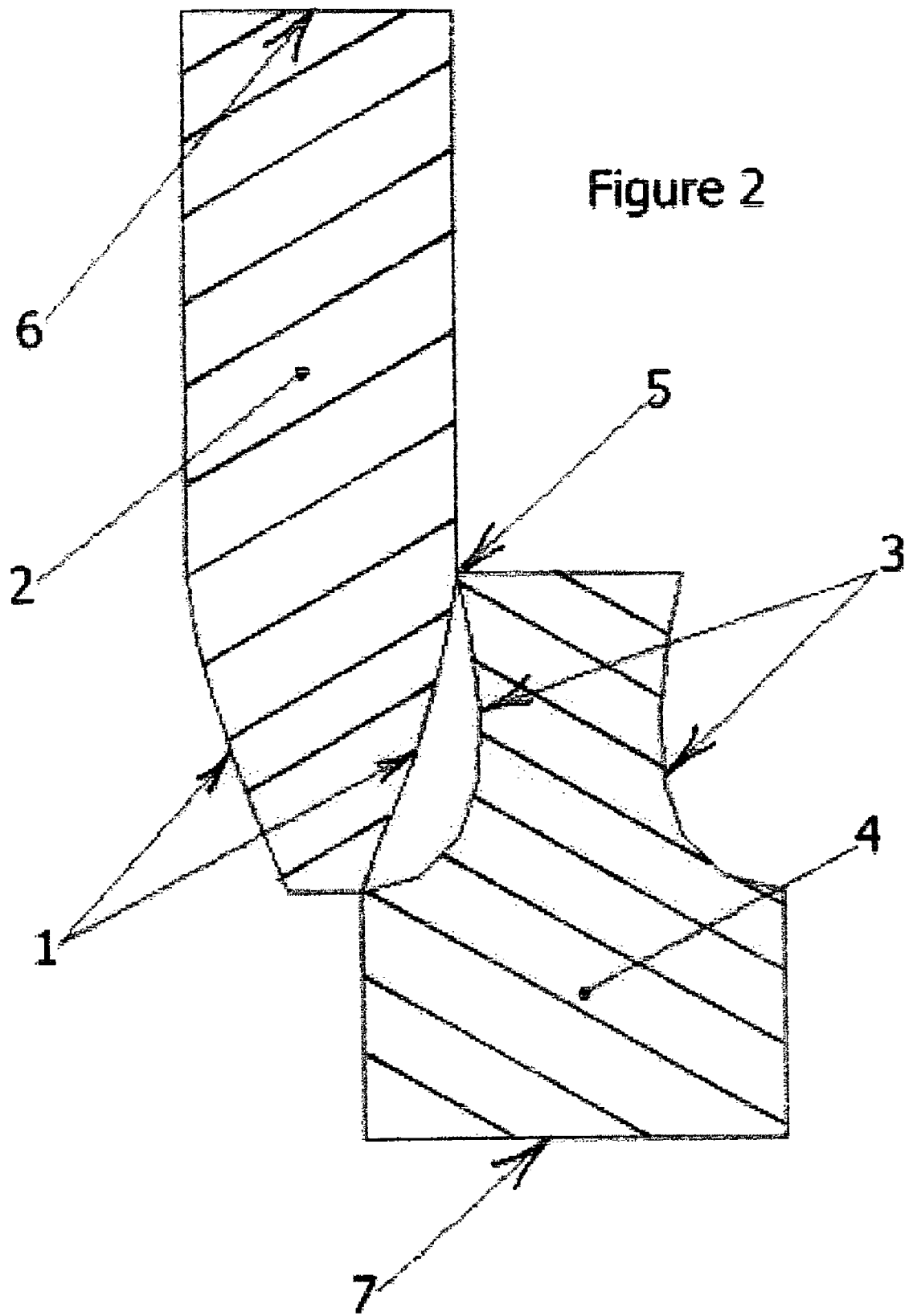
FIG. 2. Shows the cross section of a simple novolute engagement. 2 is the generated part, 4, the generator, 1 is the novolute profiles, 3 the counternovolutes profiles, 5 indicates the generating edge, 6 is the shaft of the generated part, and 7 is the shaft of the generator.

The following description relates to an engagement of screws with parallel shafts. In novolute engagements, each member has a hand helix, different to the one existing in the engaged member. Initially, a single novolute design is described:

One of the two members of the transmission is named a generator. It is defined as a screw having a helical edge protruding a bit on one of the flanks of the thread. See the generator and novolute profiles in FIG. 2.

This helical generating line 90 is located at the pitch circle of the engagement. This helical line will be making contact with the other member, the generated. The side surface of the generated member is built in such a way as to touch the helical line of the generator along the longest possible path, it is from the line of centers 89 until the outermost edge of the thread. This is the novolute surface shown in FIG. 3, indicated by 11.

The contact between those two parts can not go along the full arc of the helical of the generator included within the intersecting circles of the parts. The longer that contact may be, is from the line of centers 89 to one of the extreme points of the arc. If the line contact goes from the line of centers 89 to one extreme of the arc or the other, is defined by the hand of helixes and the flank of thread making contact.

The demonstration of how the contact between the generating helical and the generated surface takes place only on one side of the line of centers 89, is written in point 3.

Figure 3:
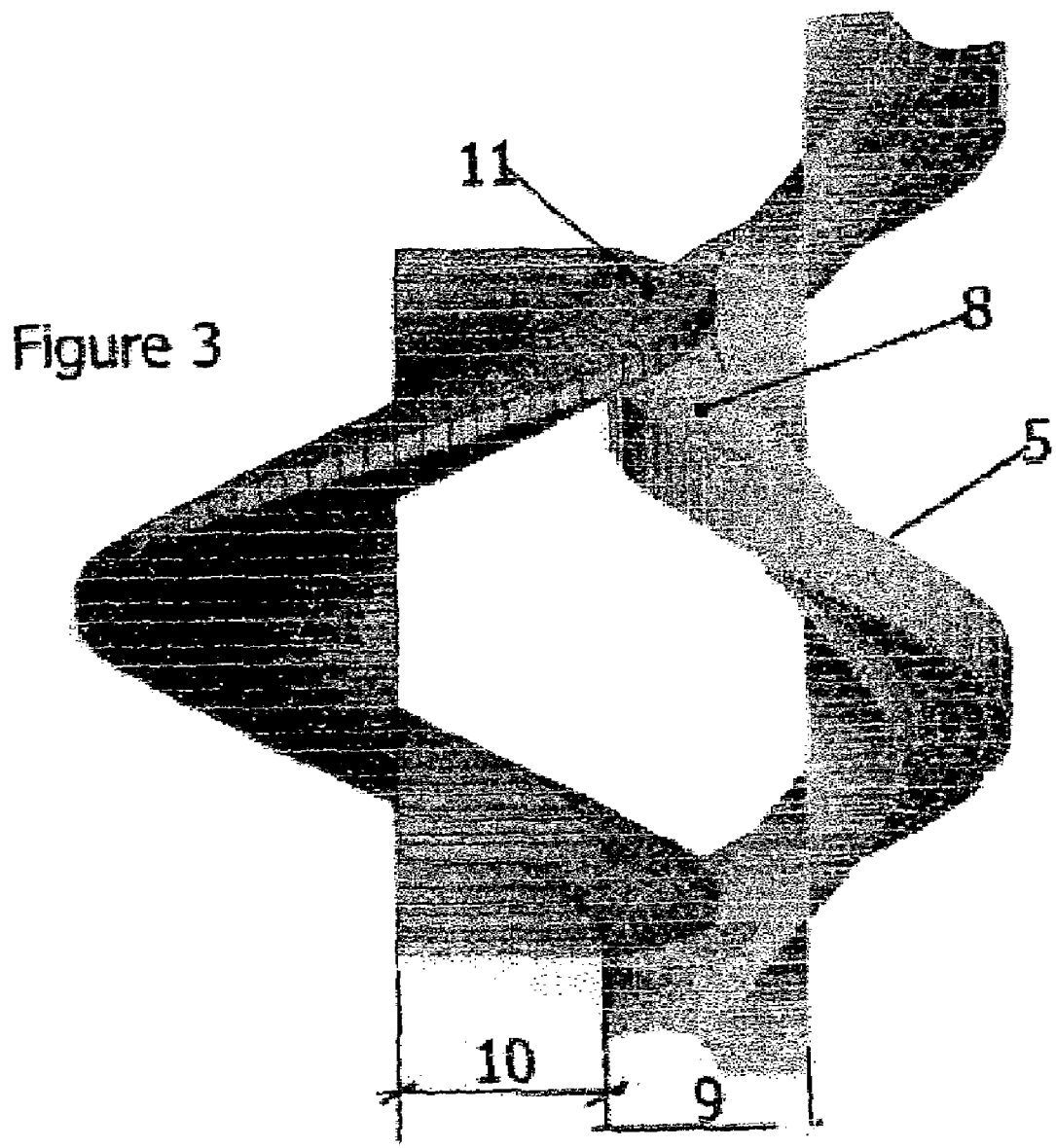
FIG. 3. Shows a three dimensional view of the simple novolute engagement. 5 indicates the generator edge, 11 the novolute surface, 8, the counternovolute surface, 9 is the pitch radius of the generator, and 10, the pitch radius of the generated.

So far, a single novolute design has been shown. FIG. 3, show a three-dimensional model of it, detailing the zone where the contact takes place. Note that the angle of the observer, correspond to the Y axis of coordinates: the axis of the parts are located on the vertical axis, parallel to the Z axis. Also note that, the parts are shown without shafts. They only have the profile in contact and a portion from there to the center of the parts.

Next step is the construction of the counternovolute within the body of the pinion, using as generating member, the exterior edge of the novolute surface just built.

The counternovolute is the shape of the pinion's body that having as much material as possible, does not interfere with the novolute surface of the wheel. In other words, is a novolute generated by a diameter bigger than the pitch diameter.

Now, the description of the second novolute of the same engagement, follows:

As can be noted from the FIG. 3, the novolute surface exists to the outside of the pitch circle of the wheel of the transmission. Also can be noted that, in the generator member, the counternovolute profile does not go any farther than the pitch circle.

Then, the second novolute surface can be inserted in the set, as follows:

The wheel's pitch diameter is used as the second generator diameter of the engagement. In that diameter, the smaller diameter of the novolute is found. Then, this helical line or inner edge is the second generator.

An exterior diameter is defined for the pinion or small gear of the example, bigger than the pitch diameter.

In the zone between the pitch circle of the pinion, and its exterior diameter, is located as much material as needed to contact the wheel's generator line. Again, the longest possible path for this contact, goes from the line of centers 89 until the outer edge of the thread, on one single side of the line of centers 89. In this way, the pinion is provided of a novolute surface that will be in contact with the wheel's generator line all the time while the engagement turns following the conjugate action law. The last step is the construction of the second counternovolute surface within the wheel's body.

The shape of this counternovolute is defined by the novolute surface of the pinion interacting within the wheels body: The counternovolute is the shape of the wheel's body that having as much material as possible, does not interfere with the novolute surface of the pinion. Again, the side of the line of centers 89 on which this process takes place, is the opposite one to that where the first novolute surface was built.

Figure 4:
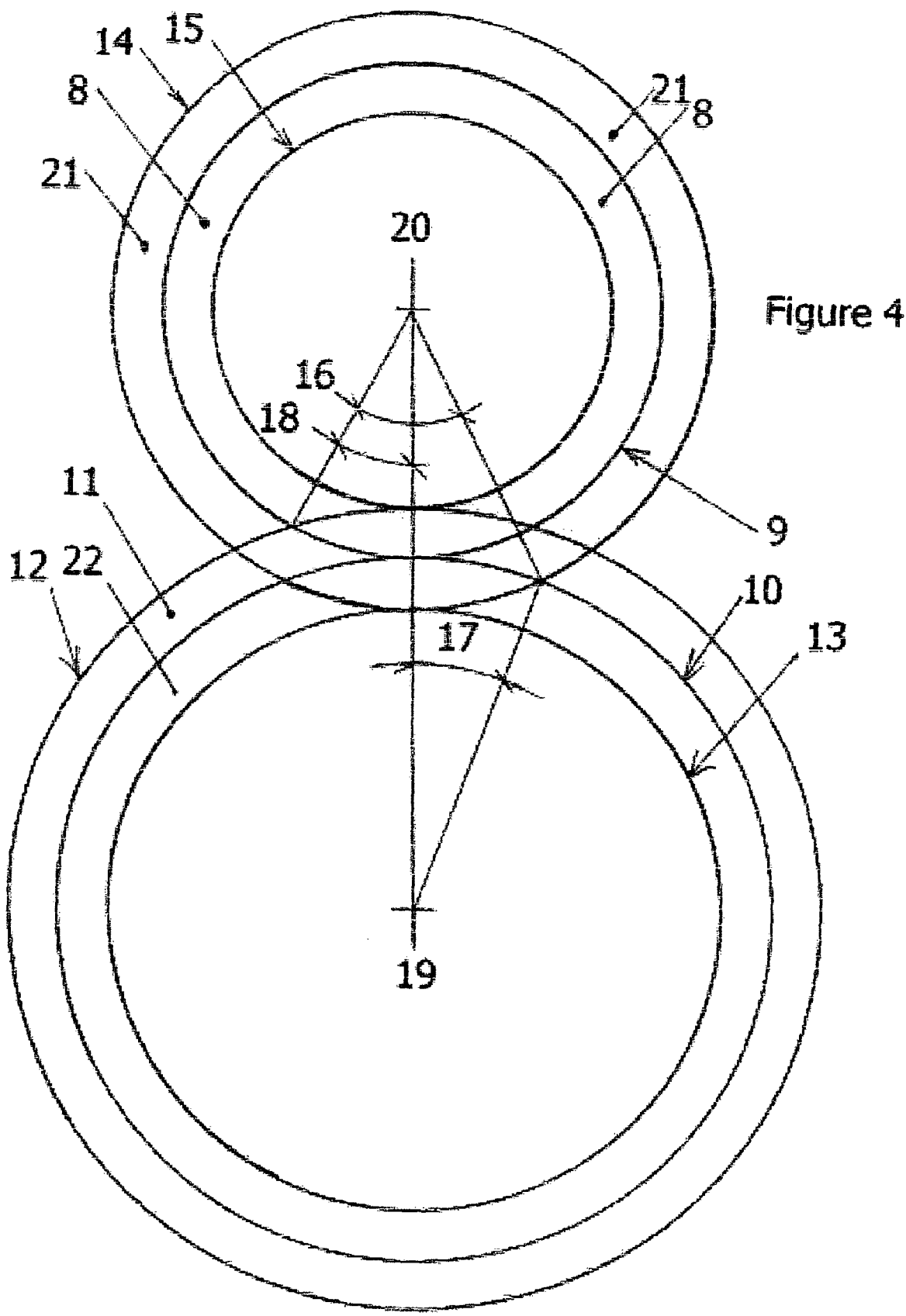
FIG. 4 Shows a double novolute engagement seen in the plane of rotation. 9 indicates the pitch circle of the pinion, 10, that of the wheel, 11 is the novolute surface of the wheel, 12 is the outer diameter of the wheel, 13, is the inner diameter of the counternovolute of the wheel, 14, the outer diameter of the pinion, 15, the inner diameter of the counternovolute of the pinion, 8, indicates the counternovolute surface of the pinion, 16 is the full angle of contact of the pinion, 18 is the angle of contact of the generator profile of the pinion, 17 is the angle of contact of the generator profile of the wheel, 19 is the center of the wheel, 20 is the center of the pinion, 21 is the novolute surface of the wheel, 22 is the counternovolute of the wheel. 48, 51, shows the initial point of contact, and 39, 36, the last one.

All the analysis of the contact already made for the single novolute engagement can be repeated for the second novolute of the set. As FIG. 4 shows, the contact line of the second novolute is located to the other side of the line of centers 89. In this way, with the second novolute the line of contact is greatly extended, covering an angle as wide as the intersection of both screw bodies. The contact for one novolute, goes form the pitch point to point 48, 51, and the contact for the other novolute goes from the pitch point to the point 39, 36.

Figure 5:
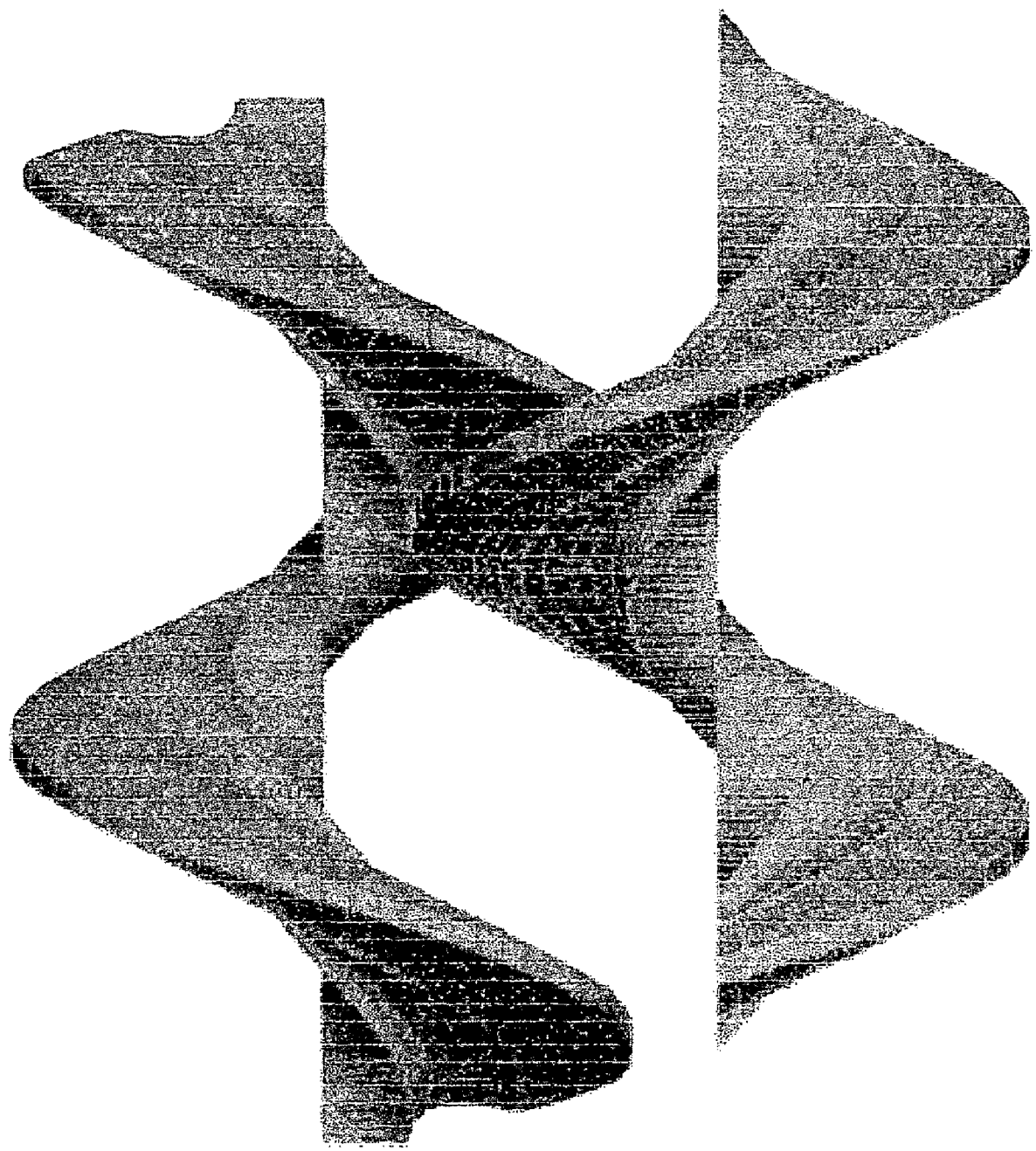
FIG. 5. shows a three dimensional view of a double novolute engagement. Both novolute surfaces and both counternovolute surfaces are obvious. The engagement has no core neither shafts, for clarity.
Figure 6:
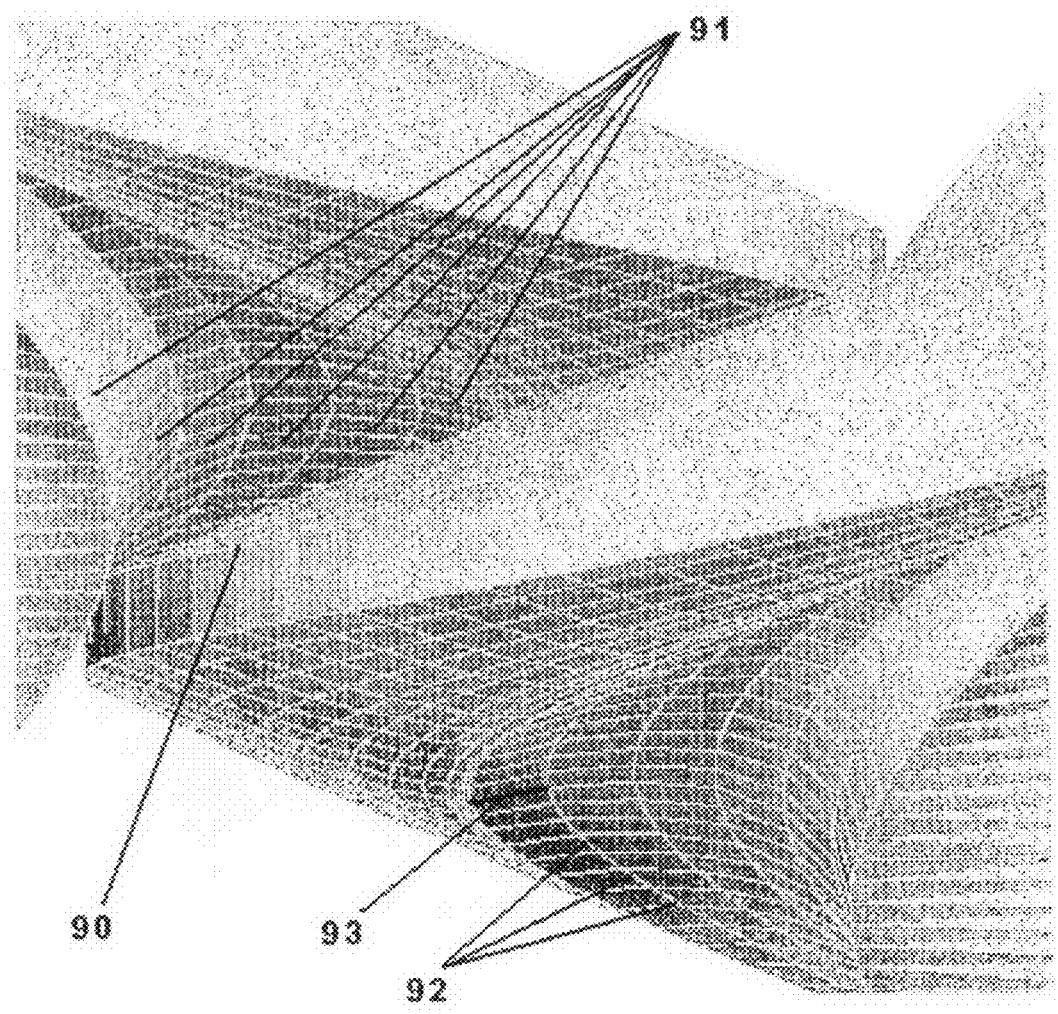
FIG. 6. Shows a detail of the contact zone of FIG. 5.
Figure 7:
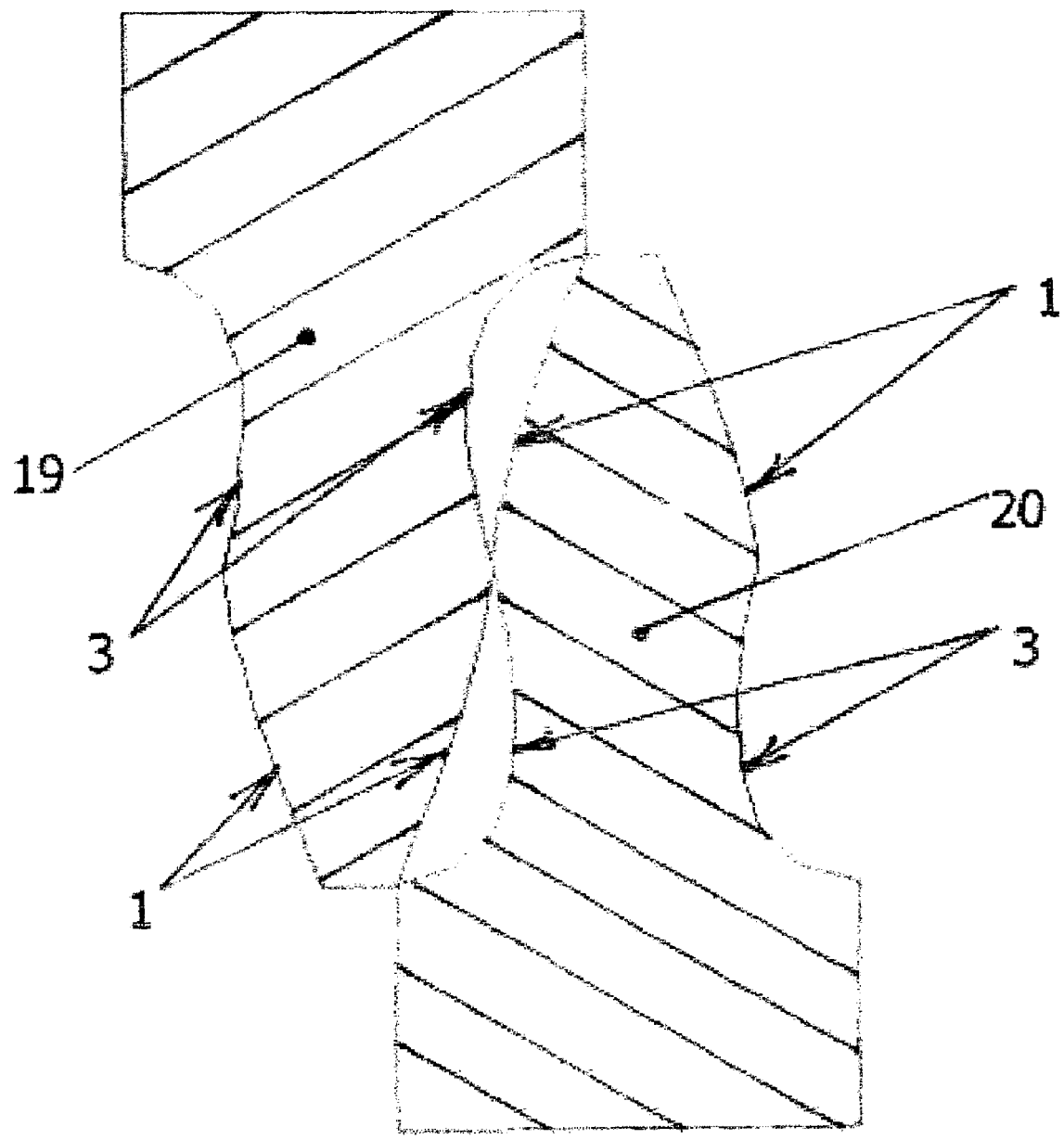
FIG. 7. Shows a cross section of a double novolute engagement. 1 indicates the novolute surfaces, 3, the counternovolute surfaces, 19, the body of the wheel, and 20, the body of the pinion.

FIG. 5, shows the double novolute engagement in a similar manner to the one included in the figure for single novolute engagements. FIG. 6 shows a detail of the contact zone. FIG. 7 shows the profile's cross sections for both parts.

The engagement shown does not work a whole turn, as the pinion is shorter than the wheel, and both members have only one thread and one full turn.

Figure 8:
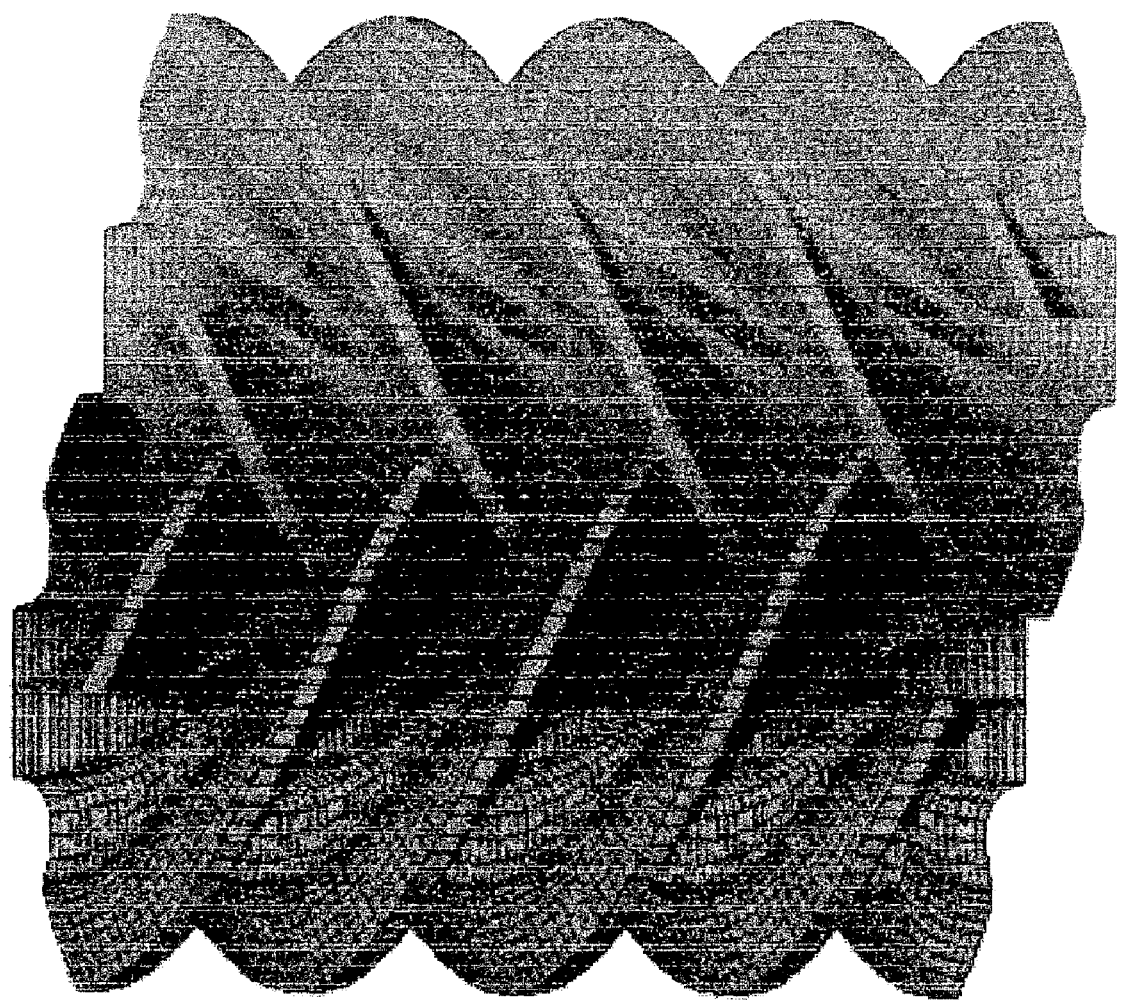
FIG. 8. Shows a novolute engagement with several working threads.
Figure 9:
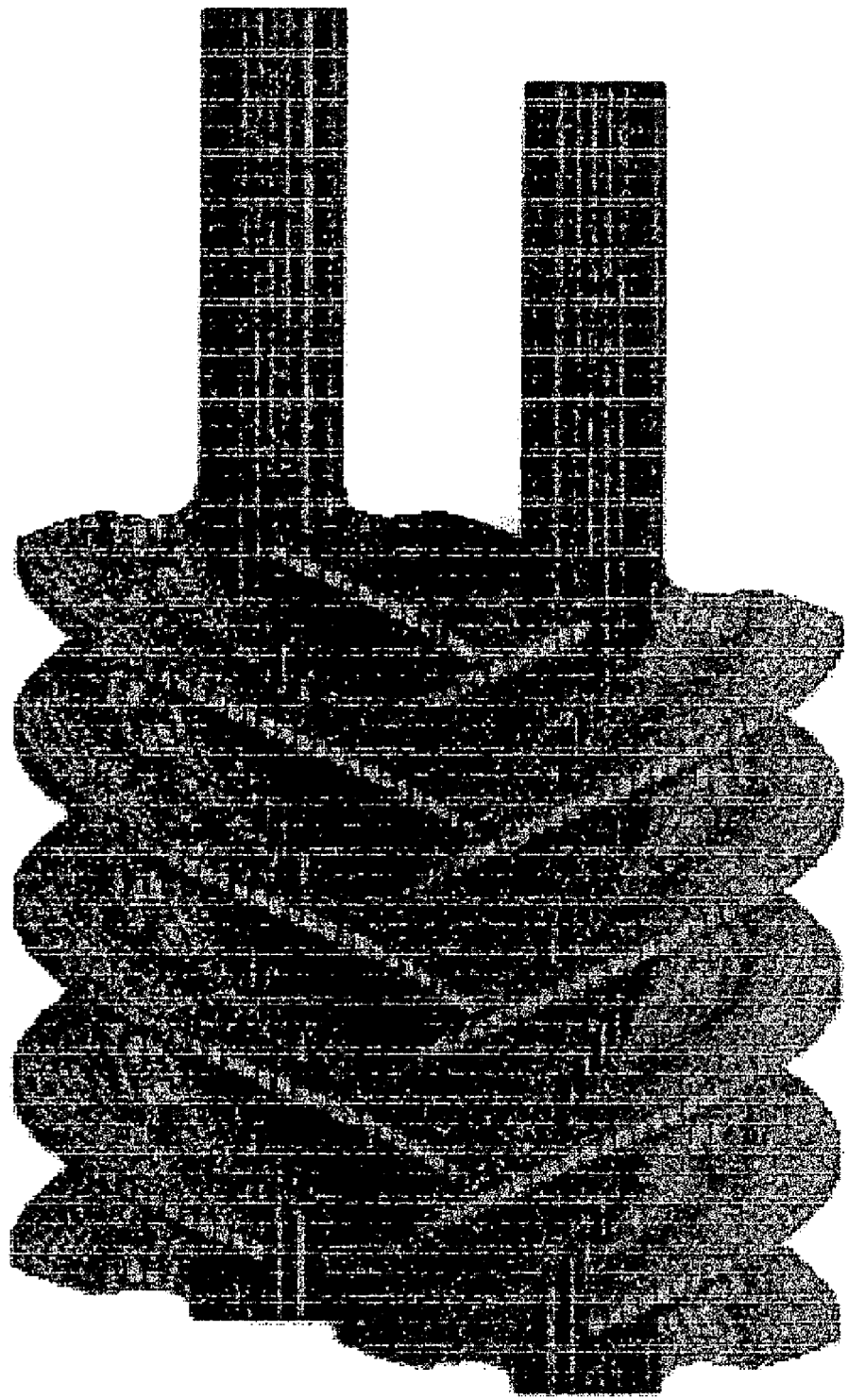
FIG. 9 shows the same engagement of FIG. 8, provided with shafts.

To complete the embodiment of the part, several threads are accommodated within the space left between the subsequent passes of the same thread. See FIG. 8. Also, the parts are provided with shafts. Doing this on both members of the engagement uses the material and space in the most efficient way. Once all the periphery of the parts is filled with threads, a slice of the screws can be taken, as shows FIG. 9 and an appropriate core is built within the inner diameters, completing the process, and producing the finished parts.

1.2 Definitions of the Novolute Surface and Novolute Curve.

A portion of the generating helical is included within the geometrical body of the generated part. During the rotation, an identical section is maintained, made up of successive points of the generating helical. During the rotation, this section travels along a path parallel to the axis. This axial displacement is proportional to the rotation of the engagement. The said conjunct of sectors of the generating helical, located within the generated member's body, while the elements rotate following the conjugate action law, constitute the helical ribbon or Novolute surface. The novolute curve is the section of that surface, cut by a plane that contains the axis of the engagement. The Transverse Novolute is the section of the same surface, but cut by a plane perpendicular to the axis.

3 Generating Action and Contact:

3.1 Analysis in the Plane of Rotation.

Lets consider an engagement with double novolutes, with pitch generating diameters.

Let's analyze first the behavior of a generating point on the wheel, like 38 in FIG. 10 belonging to the pitch circle of the wheel, and its interaction with the generated point 35 belonging to the pinion and located on a diameter bigger than the pitch one of the pinion. Point 35 is generated by point 38. Hands of helix are defined as such that have Z coordinate growing in the opposed sense to indicated rotation.

Three different moments are analyzed: the first when the engagement is located where point 38 has a symmetrical position with respect to the second one in respect with the line of centers, the second one, after the generating point crosses the line of centers, (indicated by 36, 39 in the figure), where the generation action occurs, and the third moment, located after the second one, where the engagement has rotated an angle, to get to the positions indicated by 40, 37 in the figure. The angle separating the second position and the line of centers is named $\beta_1$, is indicated by 32 in the figure. Consequently, the angle separating the line of centers and the first position, is also $\beta_1$, and the angle separating the first and second positions, is $2\beta_1$.

The corresponding point of the pinion, is the point 36, which is in contact with 39 in the second position, this is that 36 is generated by 39. Points 35 and 36 indicate the positions where this point is located, in the same instants when the point of the wheel is located in positions 38 and 39.

Points 35, and 36 are separated by angle 2α1. The relation between angle α and angle β, is such that the conjugate action law is kept: α=β/transmission relation.

As can be seen from the view in the plane of rotation, (plane with coordinates X and Z), points 36 and 39 only touch each other in the second position. When the engagement has rotated, and the two points are in positions 37 and 40, they are not in contact, as point 37 is farther from the line of centers than point 40.

When the engagement is in the second position considered, and points are located in positions 36 and 39, they are touching. When the engagement has rotated, they are separated by distances in the Y and X directions, and one of them not within the intersecting area of the two gears, so they can not touch or interfere.

Always, the generated points advance faster that the generating points, while the transmission rotates. This is so because the generated points are located on diameters bigger than the pitch diameter, but the generating point is always located on the pitch diameter. The conjugate action law defines that the peripheral velocities of both engaged members, measured in the pitch circles, are the same. Then, any point belonging to one of the members of the transmissions located on a diameter bigger that the pitch diameter, moves with a peripheral speed bigger than that corresponding to the pitch circle.

Generated points always have diameters bigger or equal to the pitch diameter: the generating point can never go to places within the generated part's pitch circle. There is only one condition when the generated point has radial distance equal to the pitch radius: when the generated point is the pitch point itself.

The lower portion of the drawing, shows the same engagement seen in the plane of axis, (Coordinates Z and X). The locus of the points 35, 36, 37 38 39 and 40 are also shown. The successive locations of points 35 and 38, 36 and 39, and 37 and 40, are seen on a line perpendicular to the axis. Such straight line represents the plane in which the said points rotate.

From this view is obvious that the generator member, which includes the positions 38, 39, and 40, must be built with material located in the direction with increasing Z coordinates, and its helix must be that shown in the figure. The generated member, containing the positions 35, 36, and 37 must have the material in the direction with decreasing Z coordinates, for the hand of helix that was defined at the beginning. In such way, there will not be interference between the points of the two bodies in any position, and they will contact each other only in the second position described. Also, the side of the line of centers 89 where the contact is defined by the hands of helixes of the parts. This is shown clearly from the view in the Z X plane. If the hand of the helixes is inverted, the side of the line of centers 89 where the contact occurs is switched.

If the generator point 39 and its body, are located towards the decreasing coordinates in the Z direction, (opposite side in respect to the contact locus), then the generated point 36 and its body has to be located in the bigger Z coordinates. In such condition, the position where the two bodies contact each other is located in the other side of the line of centers 89, with the same hands of helixes. Such condition exists for the same engagement, when the rotation direction is inverted, maintaining the same member acting as driver. The contact between the same two bodies takes place on opposite flanks of the threads.

The same point 39 will make contact with the pinion in a curved line, comprised between the points 39, and the line of centers 89. Then, the contact between the point 39 and the pinion body will occur in decreasing diameters of the pinion. Each one of these points of the pinion, can be analyzed in the same way as the point 36. They all behave in a like manner, having contact with point 39, only once, in each full turn of the engagement.

In a like manner, it can be said that each and every point of the generating helical located within the external diameter of the pinion, behaves in the same way as point 39, and interacts with other points of the pinion, in a similar manner as the point 36 does. Contact between wheel's generator helical, and pinion generated surface, takes place only to one side of the line of centers 89. Which side of the line of centers 89 is the one in contact, depends on the combination of hands of the helixes and flanks of the threads in contact: Right hand wheel with left hand pinion, make contact on one side of the line of centers 89, when the contacting flanks are in a given side. The contact for the same parts takes place on the other side of the line of centers 89, if their contacting flanks are switched.

So far, the description has been done on a single plane. Similar description can be done on other parallel planes. The conjunct of generated points within the pinion, and within all the existing parallel planes constitutes the Novolute surface of the pinion. So far, a single novolute engagement has been described. Lets describe the second novolute generation to get a double novolute transmission. The following description refers to FIG. 11.

Now, the generating helical is the one having the diameter of the pinion pitch diameter. The generating point is 48, that belongs to the pinion, and generates point 51 in the wheel. This point is located in a different plane, parallel to the one containing points 36 and 39 in FIG. 10. Assuming that the generating helical lines of both members of the transmission share a common point when they are in the pitch point, it can be seen that points 39 and 48 are not in the same plane: As there are angular distances between the pitch point and points 39 and 48, seen in the rotation plane, and as these angular distances have the same rotation senses but belong to different parts, with different hand of helix, every rotation takes points 39 and 48 away from the pitch point in the Z axis, in opposite directions.

To find the Z coordinate of point 48, it is necessary to displace along the generating helical of the pinion, in the direction with decreasing Z values, beginning in the pitch point, and until point 48 is reached. FIG. 11 represents that plane. A coordinate in Z smaller than that of the pitch point is reached. To find the Z coordinate of point 39, it is necessary to displace along the generating helical of the wheel, beginning in the pitch point, until point 39 is reached. A coordinate bigger that that of the pitch point is reached. FIG. 10 represents that plane.

It is worth remembering that the engaged screws have different helix hand. So, even as the rotation taken by the helical line of the wheel while traveling from the pitch point towards point 39 happens in the same sense as the rotation required by the pinion helical line while going from point 48 to the same pitch point, the displacement that correspond to each helical, in the Z direction, have opposed senses, as each one follows its own helical.

The analysis then, happens in a different plane, parallel to the first one considered in the FIG. 10. In the upper portion of the figure, both planes appear simultaneously. In the lower portion of the figure, (View in the plane with coordinates Z and X), the action of each set of points is shown on different planes.

Again, three different positions of the engagement are analyzed: the first position, when the generator point is located in a position before the second one, indicated in the figure as 47. In the second position points 47 and 51 are in contact, and the generating action takes place. The third position, when the engagement has rotated further from the second position, until generating point reaches 49. The locus of the generated point is indicated for the first, second and third positions as 50, 51, and 52 in the figure.

It can be seen from the figure, that the generating action takes place in the right side of the line of centers 89. It is the opposite side to the one where points 36 and 39 made contact, as the former analysis showed. As it has been shown that points 48 and 51 belong to the same parts containing the points 36 and 39, and are located on the same flanks of the parts, it can be said that the pinion, containing the generating point, has the material located from point 48 and towards the zone with smaller Z coordinates. Also it can be said that the wheel, containing point 51, has its material located from point 51 and towards the zone with bigger Z coordinates, exactly as it has been said of points 36 and 39, which belong to the same flanks of the same parts.

A description for points 48 and 51, similar to that performed for points 36 and 39 follows:

The angle included within point 48, the center of the pinion, and the line of centers 89, named $\alpha 1$, is equal to that formed by the line of centers 89 and point 49. Point 47 is located somewhere before the transmission has rotated to get to point 48. The transmission must rotate an angle equal to $\alpha 4$, to get to point 48. In the figure, 46 indicates $\alpha 4$ and 45, $2\alpha 1$.

To go from point 51 to point 52, the wheel must rotate an angle 2. $\beta 3$, indicated by 44 in the figure. To go from point 50 to point 51, the transmission must rotate an angle $\beta 4$, indicated as 43 in the figure.

The relation between angles $\alpha$ and $\beta$ having the same subscript, equals 1/transmission relation, in every case, keeping the conjugate action.

Generator and generated points only make contact once in every full turn of the engagement: by definition, they are in touch when in the position 48 and 51. Later, when the rotation has occurred and they are positions in 49 and 52, they do not touch, as point 52 is farther away from the line of centers 89 than point 49. As can be seen in the view in the plane of axis, (With coordinates Z X), where the distance in the X direction separating points 49 and 52, where the condition of the two parts being one away from the other, considering the side towards where the material of the parts is located. Again seen on the plane of rotation, it is clear that points 47 and 50 are not in contact, as they are separated by a considerable distance in the Y direction.

Any generator point of the generating helical of the pinion, behaves in the same way as the generating point 48. Then, each point of the generating helical of the pinion generates a series of points in the wheel. Each one of this generated points, make contact with the pinion only once in every turn of the engagement. All these generated points are located in the same side of the line of centers 89 as the generated point 51, but each one is separated of the center of the wheel by a different distance.

Then, it can be said that each generator point contacts the wheel all the time while traveling from the outermost point of the wheel, until reaching the line of centers 89. Obviously, all this points of contact are located in the same rotation plane. It can also be said that the path of contact exists only on one side of the line of centers 89.

The other fact that all the analysis shows is that each generating helical belonging to each member of the transmission, generates novolute surfaces on the matting member on different sides of the line of centers 89. Then, the construction of double novolute engagements produce contact between the two matting members of the engagement along all of the angle included inside the overlapping sectors of the two parts, seen in the plane of rotation. Then, the double novolute type of construction complements the path of contact obtained with single novolute engagements, that go only from the line of centers 89 to the outermost point of intersection of the two bodies.

Similar analysis can be done for every other plane parallel to those analyzed. Each one of those planes contains one point of each of the two generating helical lines, and each one of those points generate a conjunct of points of contact between the two parts. Those conjuncts of points belong to the generated part. The conjunct of those conjuncts of points constitutes the novolute surfaces of each part.

FIG. 12 includes the two planes analyzed in the FIGS. 10 and 11. This figure shows the three positions of the engagement. The same points already described and their positions are indicated by the same numbers. The figure includes the two planes shown in FIGS. 10 and 11. In the upper part, both planes appear simultaneously. In the lower part of the figure, (seen in the plane with coordinates X and Z), the action of each pair of points is shown in different planes.

3.2 Description in the Z Direction.

The following description refers to the same engagement, viewed in the plane of axis. (Plane with coordinates ZY). Lets consider first the generation process when the pinion is the generator member.

Now, the description is performed on a plane parallel to the plane of axis, and containing one of the generating points, say 59 and its generated point. See FIG. 13. As both points, generating and generated share the same locus in all the following discussion, only one of them will be mentioned, using a letter and a subscript. Letters refer to series of points with same XY coordinates, and subscripts refer to the locus of points shared by both members of the transmission, in different instants of the transmission rotation.

There is a generating point of the helical generating line 91 existing within this plane, for each position of the engagement during its rotation. The points corresponding to each position, are indicated by 69, 70, 71, 72, and 73, for the first plane in the figure. As all of these points belong to the generating helical, they must be included within the cylinder containing this helical line. As they are all included within each plane of the analysis, they all share the same coordinate in the X-axis. These points also share their coordinate in the Y-axis, as the axis of the generating member is parallel to the Z axis. As all those points have the same X and Y, they constitute a straight line, and as they belong to the cylinder that includes the generating helical, they belong also to a generatrix of the said cylinder.

All those points are simultaneously generating and generated, as by definition, both members of the engagement share their locuses. It is also truth that their Z coordinates are proportional to the rotation of the engagement, as they belong to the generating helical. Then, they not only constitute the generating helical, but also constitute a generated helical. This second helical line is contained within a cylinder with the same axis of the wheel, the radius of this helical, is the distance from the center of the wheel to point 59, in the rotation plane. (See FIG. 13, view in the plane X-Y).

Performing similar analyses for each series of points of the helical line, other generatrixes appear, each one shared with the generator helical, and with the generated helical, with its axis in the center of the wheel. The difference between successive generating points like 58, 59, 60, 61 and 62 while the engagement rotates, are two: Each one has different coordinates in X, Y, and Z, axis and each point generates a different helical line on the wheel. All the generated helical lines are concentric sharing the same axis with the wheel but having different radiuses. See 53, 54, 55, 56 and 57 in FIG. 13. All the helical generated lines are displaced in the Z axis, in the same amount as are the initial points of the generating helical line.

These serial analyses can be done for positions of generating points between the line of centers 89 and the outermost point belonging to both members of the engagement (58 in figure). Contact points only exist to one side of the line of centers 89, as was demonstrated above in this document.

Then as the generating helical is only one line but the generated helicals are many it can be stated that each generating helical line generates a helical surface named the Novolute surface. The generated surface is the conjunct of generated helical lines, lying one besides another. Such surface is a helical surface, of three dimensions.

A similar analysis can be performed for the same engagement but looking to the generating process when the wheel is the generating member. Then the second generated novolute surface is obtained located in the other side of the line of centers 89.

The conjunct of generatrixes that are shared by both members of the engagement build up the surface of action.

In double novolute engagements there might be two surfaces of action if both generating diameters are not coincident upon the line of centers 89.

4.—Theoretical Limits of the Profile.

The theoretical limits are fixed by the minimum possible distance between the generating point and the center of the generated part and the farthest point from the generated center where the generating point can still produce the movement of the generated part while the gear set is in operation located when the generating point is on the line of centers 89 at the place where it is farthest from the center of the generated part.

5—Different Generating Radiuses. Typical Profiles of the Novolute.

5.1—From the Pitch Generating Circle.

The typical form of the Novolute, if generated by the pitch circle is:

Beginning at the point closest to the generated shaft when the generating point cuts the line of centers 89, the Novolute is tangent to a straight line perpendicular to the shafts. The profile continues developing towards the exterior (receding from the generated axis and approaching the generating axis) as a curved line with an increasing radius the outermost point of which is that where the generating point cuts the blank of the generated wheel.

5.2—Generating Circle Greater than the Pitch Circle: The Counternovolute.

The generating process of a novolute whose generating diameter is bigger than the pitch diameter takes place on the other side of the line of centers 89 in respect to the side where a simple novolute forms if generated by a diameter equal or smaller than the pitch diameter.

The typical form of the Novolute generated by a circle greater than the pitch circle is named counternovolute, and has a concave shape.

In the point closest to the pitch point it begins with some inclination with respect to the line of centers 89 making a blunt edge with the novolute that might exist in the same part but in opposite direction from the pitch point.

Towards the center of the part containing the counternovolute it goes following a curved path every time closer to the line of centers 89 reaching a point where is parallel with it and then keeps on a curved path with decreasing curvature radius until its last point, where its tangent is parallel to the shafts. All the time the curve is in the same side of the line of centers 89. This last point exists where the generating line is closer to the center of the part containing the counternovolute.

5.3—Generating Circle Smaller than the Pitch Circle.

For a Novolute profile generated by a diameter smaller than the pitch circle, the typical form is:

Beginning at the point closest to the generated part axis the Novolute has a well-pronounced curvature with an increasing radius the centers of curvature located on the opposite side as compared to the curves of the novolute generated by the pitch radius.

Towards the exterior there is a point where the curvature sense changes with the curvature center on the same side as the pitch radius generated novolutes. The point where the curve changes its direction does not have a tangent perpendicular to the axis. The entire curve is inclined in the same direction with variable slopes.

6.—Solid Curved Generating Profile.

6.1—The Modified Novolute.

As far as the analysis has been carried, it contemplates a generating helical line, with no width. In the real world, for this helical to exist, it must be a three dimensional body. For the purposes of analyzing the contact behavior of parts in contact, such as the novolute and its generating profile, a solid body with known dimensions must exist. This solid body gives them load carrying capacity.

In order to fulfill this requisite, a curved generating profile has been developed, which is accommodated below the pitch point of the part, continuing the novolute that is built on that part above the pitch point. To have a smooth curvature, the profile might begin in the pitch point as a curve that is tangent to the line of centers 89. Then on, as it goes away from the pitch point, it also goes away from the line of centers 89. This profile might have a circular section, or might be a different curve.

This profile is located in a zone where the counternovolute drawn by the simple novolute would have taken away the material, thus avoiding the possibility of making such generating profile. Following the process of construction of the modified novolute, will demonstrate that the generating profile can be accommodated.

By now, it is clear that the construction of the curved generating profile, avoids the problem that arises from the blunt edge existing between the novolute, and the counternovolute surfaces. This blunt edge makes it difficult to have an acceptable load carrying capacity for surface contact, but the existence of the curved profile gives the engagement a big contact load capacity.

Now, the analysis of what happens to the novolute surface corresponding the such generating profile:

Taking each point of the generating curve as belonging to a generating helical line, with its center in the center of the generator, it is possible to draw a number of novolutes, each one corresponding to each one of this generating helical lines.

The first novolute, that drawn by the pinch point, has the shape already described, with a smooth curvature, with increasing curvature radius as it goes away from the pitch point. For each one of the other points, the corresponding novolute has a concave zone. At its beginning, close to the pitch point, the concave curve has a small curvature radius, which grows until a zone where the curvature changes from concave to convex going through a flat zone, and then on it is curved continuously.

As FIG. 14 shows, all these novolutes intersect each other, at different points. There is a single curve which envelops all of them, as FIG. 15 shows, which is the actual shape of the novolute existing in the generated part. This is the modified novolute.

The shape of the modified novolute is defined by all the design factors, like transmission relation, pitch of the screw thread, height of the novolute, helix angle, including curvature radius of the generating profile. Giving appropriate size to the generating profile radius, the modified novolute might be given a shape such that its minimum curvature radius be big enough as to satisfy the requirements for a good surface load carrying capacity.

As the modified novolute has less material that the simple novolute, the edge of it that works as the generating profile for the counternovolute of the matting member, takes away less material from that part, than that taken by the simple novolute. It means that the hollow zone existing below the pitch point, in the zone of the counternovolute, is less hollow, and consequently allows for the existence of the curved generating profile.

When the generating profile begins at radius smaller than the pitch radius, the tangent to the first point of the curved profile must be inclined in such a way as to allow the profile to be accommodated within the concave zone of the novolute, without any edges but smooth surfaces making contact.

6.2—The Modified Counternovolute.

For engagements with generating diameters bigger that the pitch diameter, a similar analysis can be done. As the shape of the counternovolute has zones with opposed inclinations with respect to the line of centers, the generating profile must have portions able to contact those zones smoothly. This means that a wide circular generating profile has to be drawn at first, then an assortment of novolutes generated by different points of such profile, has to be drawn, and then, the zone of the profile to be used is selected, including those points whose novolutes participate in the formation of the modified novolute, and a few more, adjacent to those, at both extremes, to ensure an easy contact between surfaces.

7.—Several Fractionate Profiles.

Several fractionate profiles, generated by different generating points, located or not on the same generating radial line, but at different distances from the center, can work simultaneously on the same part but on different portions of the Novolute which each one generates.

This possibility assumes that each portion can be built in such a way that each one only requires an angular contact area: Each point contacts over a range of different radius which prevent the others from making contact on those radius of the generated gear.

In this manner, several contact and support points are obtained over zones that can be overlapping or separated in the direction of the plane of rotation, or can be coincident on the radius.

8.—Curvature Radius.

The novolute curvature radius depends on the generating radius, transmission relations, helix angles, novolute zone being considered, and in general, of all the geometrical design factors.

Novolute curvature radius are significantly larger than those of involute gears with similar exterior dimensions. The advantages given by this factor are evident, when one thinks of the calculations about hertzian behavior, which depends on the values of radiuses of the contacting parts, with the advantage found in the side of the bigger curvature radiuses. The apparent disadvantage for novolutes is that they must be used along all of the length of the novolute, in order to use them on the full angle of contact of the parts, and their root of the profile has a short curvature radius. The novolute curvature radius are bigger than involute curvature radius for gear pairs with the same pitch diameter. Nevertheless, for both, in the root zone, the curvatures are small. This is a limitation for novolutes, as they work from the root of the profile, while involutes are used only from a point above the root of the profile, where radiuses have a significant value, which is bigger than that found in the root of a novolute.

The actual limiting factor comes from the shape of the generating members of novolute transmissions: for normal novolute surfaces, the generating members must have a profile whose shape is limited by the corresponding counternovolute. Although, this limiting factor can be overcome, using generating profiles with circular profiles, with radiuses defined by the designer, coupled with modified novolute gears. Curvature radiuses in modified novolutes depend on the shape and size of the curved generating profile. As the typical shape of a novolute generated by diameters smaller than the pitch diameter, have a concave zone in the zone closest to the pitch point, the modified novolutes might have not only small or big curvature radius, but also might get to have a concave zone, depending on the shape and size of the generating profile.

In these conditions, the novolute engagements have good contact load carrying capacity.

9.—Best Mode of Carrying the Out the Invention

The form which uses in the best manner the advantages of the novolute geometry, uses double novolute engagements, built on both flanks of the thread of the power screws. In this way, the widest contact is obtained, thus, the bigger load carrying capacity is built within a given gear size. The preferred embodiment uses the generating diameters of the parts just a small amount smaller than the pitch diameters, which builds modified novolutes with very convenient curvature radii, while maintains the efficiency of the set in the best conditions, due to the minimum slippage that corresponds to the generating diameters close to pitch diameter. The generating profiles are curved, with rather big curvature radii, also to give the engagement a big load carrying capacity. Thread height and efficiency must be balanced, because increasing thread height increases contact length and load capacity, by at the same time, the efficiency of the set is decreased.

10.—Thread Profile Modifications.

Several modifications can be done to the profile of the thread, in order to improve the load carrying capacity of the engagement.

The first one, is to give the thread a thickness such as to make it just as strong as is required to balance the design, as for to make it have the same service life for beam strength, as it has for durability.

An extension of this modification, is to carry the same procedure for both members of the engagement, taking into account that due to the transmission relation existing between them, the engagement life span means different number of cycles for each member. By means of the thread thickness modification, it is clear that each member can be given the required life. In so doing, the size of the set is optimized, because the smaller width that the threads have, the thinnest and lightest that the engagement will be.

The thickness modifications can also be used to make engagements using different materials for each part of the set, and still have them loaded to its full potential.

11.—Asymmetrical Thread Profile.

In the majority of applications, the power flows through the engagement in the same direction all or most of the time: usually, the engagement is between a driving motor and a driven machine. Then, the teeth of the gears or the threads of the novolute screws, need to be strong on one side, but not in the other, which only works very seldom, and with light loads.

Asymmetrical teeth for gears has been tried, but no advantage has been found for them, because the limiting factor still is the durability of the parts, which depends on de curvature radii of the surfaces in contact, not by the strength of the parts, which is what the asymmetrical profile improves. With gear teeth there is also another limiting factor, because, when the teeth are made asymmetrical they become shorter, getting to a point where the teeth are so short, that when a pair of teeth is ending its contact, the next pair has not made contact, so the engagement is not workable, because it losses its feature of continuous positive displacement.

Novolute screws can be built with asymmetrical thread profiles, with one side having wide contact, and thus good ability for load carrying, and the other side, with contact only towards the line of centers 89, and low load carrying capacity. The side with short contact, can accommodate a stronger thread profile, making it thicker towards the base, and thinner towards its upper end. With novolute screws, then, it is possible to use the asymmetrical profile concept with advantage, as the thread becomes stronger and can be built thinner for the same service, meaning that the face width of the engagement becomes smaller.

Another modification made possible by the asymmetrical profiles, is the extra thinning of the exterior portion of the novolute profile. This is done with the aim of getting a less stiff zone. As that zone losses stiffness, will take less load than other zones of the novolute, which are not deformed in a like manner when loaded. As the exterior zone of the novolute is the one causing the bigger cantilever stresses, is the one that limits the carrying capacity of the thread. The rest of the working thread suffers a smaller stress, and thus, is not working at its full potential. With the thinning of the exterior zone, although some load carrying capacity might be lost in that zone, the load carrying capacity of the set can be improved, because the average stress (and load carrying capacity) are made more similar trough all of the working length of the thread.

12.—Increased Base Height of the Thread.

When there is a considerable size of the root space between successive threads, a further increase in load carrying capacity for strength can be obtained by means of increasing the height of the thread, deepening the root, and at the same time, making the thread thicker in that zone. While the height of the cantilever beam is increased, losses carrying capacity in direct proportion with the increment in height, but at the same time, gains load capacity because of the increase in thickness, in proportion with the square of the increase in thickness. The total modification in load capacity can then be of advantage.

13.—Variable Pitch, Thread Height and Thread Thickness.

Novolute engagements can be built with variable thread height along the part.

Variable thread pitch can also be used in the construction of novolute engagements.

Variable thread thickness can be built in novolute engagements.

This three features can be valuable in the construction of engagements with non parallel shafts, in order to help optimize the design.

14.—Added Exterior Edge of the Thread.

For novolute screws engaged with others having the base height increased, it is possible to obtain a further gain in load carrying capacity within the same face width of the set, by means of increasing the height of the thread, beyond the novolute surface. The material existing there, adds stiffness to the thread, as helps distribute the stresses over a longer portion of the thread. This edge, can be built to be accommodated within the hollow left by the increased height of the matting part.

15.—Manufacturing Processes.

Novolute screws might be built using conventional machinery and processes, provided that appropriate tooling is furnished. Either turning and milling operations are suitable procedures for producing novolute engagements.

16.—Novolute Generation with Abrasive Liquid.

There is however, a procedure either for manufacturing or for finishing, which is specially suited for novolute parts, as it has the ability to improve the quality of the parts, by means of generation of the surfaces, while they work one another, providing geometrical precision better than that of the tools used in the production of the screw blanks, or unfinished novolute screws.

If a set of unfinished novolute screws is mounted and put to work using the design center distance, carrying some load, within a bath of liquid containing abrasive particles, the novolute surfaces will see their shapes improved, changes will come about as the set works, by means of the abrasive action of particles within the liquid, and the relative motion of the surfaces. As the engaged surfaces move one in respect to the other with different relative velocities in different zones of the engagement, abrasive working action is stronger where the relative velocities are bigger, it is in these zones farther away from the pitch point where there is no relative velocity as both parts of the set must roll there without any slippage. Then in the pitch zone, the abrasive action is minimal, if not nonexistent. It is clear that the surfaces will work one another, until they become very accurate novolute surfaces, much more accurate that the tools that built them. It is possible, although can be a long procedure, to built by this process the novolute surfaces, initiating the process with very roughly threaded parts.

What is claimed is within sets of two screws used for power transmission, with the following basic features:

1. A transmission power system comprising a pair of mating screws, having mating threads, an axial thread profile of a first screw of the pair of mating screws being defined by a counternovolute located inside of a pitch diameter of the first screw, on one flank of the first screw, and another counternovolute located inside the pitch diameter, on another flank of the thread of the first screw, an axial thread profile of a second screw of the pair of mating screws being defined by a novolute located outside of a pitch diameter of the second screw, on one flank of a thread of the second screw, and another novolute located outside of a pitch diameter of the second screw, on another flank of the thread of the second screw.

2. The transmission power system of claim 1, wherein the first screw, by means of a helical line defined by a point where the counternovolute intersects the pitch diameter, generates the novolute profile of the second screw.

3. The transmission power system of claim 1, wherein contact between the threads is defined by a line, which begins at an intersection between the pitch diameter of the first screw and an outermost diameter of the second screw, continues along a circumference of the pitch diameter of the first screw until it intersects with a line of centers.

4. The transmission power system of claim 1, wherein said pair of mating screws have parallel shafts.

5. The transmission power system of claim 1, wherein the pair of mating screws are coplanar.

6. The transmission power system of claim 1, wherein a helical line belonging to the first screw, which generates novolute surfaces, has a larger diameter than the pitch diameter.

7. The transmission power system of claim 1, wherein a helical line, belonging to the first screw which generates novolute surfaces, has a smaller diameter than the pitch diameter.

8. The transmission power system of claim 1, wherein a helical line belonging to the first screw, which generates the novolute, is replaced by a solid helical profile with a curve section.

9. The transmission power system of claim 1, wherein the flanks of an axial profile are asymmetrical.

10. The transmission power system of claim 1, wherein the pair of mating screws have variable thread pitches.

11. The transmission power system of claim 1, wherein the pair of mating screws are manufactured with variable thread heights throughout a length of the pair of mating screws.

12. The transmission power system of claim 1, wherein a load carrying capacity of the threads is increased by increasing a base height of the thread beyond a height required to accommodate the first and second screw.

* * * * *